(12) United States Patent
Tustaniwskyj et al.

(10) Patent No.: US 8,628,240 B2
(45) Date of Patent: Jan. 14, 2014

(54) TEMPERATURE MEASUREMENT USING A DIODE WITH SATURATION CURRENT CANCELLATION

(75) Inventors: Jerry Ihor Tustaniwskyj, Mission Viejo, CA (US); James Wittman Babcock, Escondido, CA (US)

(73) Assignee: Delta Design, Inc., Poway, CA (US)

( * ) Notice: Subject to any disclaimer, the term of this patent is extended or adjusted under 35 U.S.C. 154(b) by 970 days.

(21) Appl. No.: 12/502,986

(22) Filed: Jul. 14, 2009

(65) Prior Publication Data

US 2011/0013670 A1    Jan. 20, 2011

(51) Int. Cl.
*G01K 7/01*    (2006.01)

(52) U.S. Cl.
USPC ........... 374/178; 374/172; 374/183; 327/513; 702/130

(58) Field of Classification Search
USPC ................. 374/178, 100, 170–172, 183, 163; 327/513, 512; 702/130, 132–136
See application file for complete search history.

(56) References Cited

U.S. PATENT DOCUMENTS

| | | | | |
|---|---|---|---|---|
| 3,719,797 | A * | 3/1973 | Andrews et al. | 219/501 |
| 4,277,975 | A * | 7/1981 | Pinkham | 374/170 |
| 4,445,636 | A * | 5/1984 | Peters | 236/20 R |
| 6,021,036 | A * | 2/2000 | Bijlenga et al. | 361/100 |
| 6,111,397 | A * | 8/2000 | Leung | 323/315 |
| 6,205,010 | B1 * | 3/2001 | Ohsaka et al. | 361/103 |
| 6,345,238 | B1 * | 2/2002 | Goodwin | 702/130 |
| 6,838,869 | B1 * | 1/2005 | Rogers et al. | 324/762.01 |
| 7,216,064 | B1 * | 5/2007 | Pippin | 703/1 |
| 7,429,129 | B2 * | 9/2008 | St. Pierre et al. | 374/178 |
| 7,726,877 | B1 * | 6/2010 | Avitan | 374/170 |
| 7,893,733 | B1 * | 2/2011 | Tan | 327/108 |
| 7,948,304 | B2 * | 5/2011 | Aruga et al. | 327/539 |
| 7,978,000 | B2 * | 7/2011 | Zimlich | 327/513 |
| 2009/0306912 | A1 * | 12/2009 | Chen et al. | 702/57 |
| 2011/0254613 | A1 * | 10/2011 | Kim et al. | 327/513 |

OTHER PUBLICATIONS

LM93 Hardware Monitor with Integrated Fan Control for Server Management; National Semiconductor Corporation; Apr. 2004; pp. 1-92.

+/−1C Remote and Local Temperature Sensor with N-Factor and Series Resistance Correction; Texas Instruments TMP411; Dec. 2006—revised May 2008; 32 pages; Texas Instruments Incorporated; Dallas, Texas.

N. Takashima et al.; Investigation on the Diode Temperature-Sensor with the Output Voltage Proportional to the Absolute Temperature; pp. 328-332; 2007; IEEJ Trans. SM, vol. 127, No. 6; Japan.

* cited by examiner

*Primary Examiner* — Gail Verbitsky (74) *Attorney, Agent, or Firm* — Foley & Lardner LLP

(57) ABSTRACT

Various embodiments provide systems and methods measuring the temperature of a device using a semiconductor temperature sensor, such as a diode. This invention allows the use of an uncalibrated diode to be used as a temperature sensor by applying a sinusoidally varying forcing current to the diode and measuring the rate of change of the voltage across the diode. Embodiments advantageously provide for a rapid, responsive temperature measuring, substantially eliminating the effect of lead resistance associated with the temperature sensor.

34 Claims, 6 Drawing Sheets

TEMPERATURE MEASUREMENT USING A DIODE WITH SATURATION CURRENT CANCELLATION

FIELD OF THE INVENTION

The present invention relates generally to the field of temperature measurement. More particularly, the present invention relates to systems and methods using semiconductor temperature sensors, such as diode sensors, to measure the temperature of devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Current CPUs, information processors and other silicon and semiconductor based devices require thermal management for optimal performance. The reliability and performance of these CPUs decreases as temperature increases. Temperatures can be decreased by reducing clock rates, lowering device voltages, increasing airflow, or otherwise decreasing device temperature. Each of these solutions, however, is taxing on the efficiency of the given operating system or creates other negative effects. For example, a fan may cause unacceptable noise levels and its speed may need to be controlled to minimize noise level while maintaining an acceptable temperature. As another example, in semiconductor testing, the temperature of the device under test with widely varying power dissipation must be maintained within a prescribed range. Accurately measuring device temperatures ensures that temperature controlling solutions are implemented optimally. Therefore, an accurate, precise and fast acting temperature feedback scheme is essential to achieving maximum efficiency and performance levels while keeping electrical noise levels to a minimum.

In many instances, a device under test is an integrated circuit, which includes a die. The die comprises semiconducting material, which needs to be monitored for temperature. Temperature sensing of integrated circuit dice, for instance, can come in many forms. One such form of temperature sensor is a diode temperature sensor. Diode temperature sensors are provided within, on, or in proximity to the die or device under test being measured for temperature. Diodes are used as temperature sensors because the forward voltage across the diode is indicative of the temperature of the environment in proximity to the diode. If a diode is placed in, on, or near a die, the forward voltage across the diode is indicative of temperature of the die. When a fixed forcing current $I_F$ is applied through the diode junction, a simple equation relating forward voltage of the diode and temperature is given as:

$$T = \frac{C_1 - V_F}{C_2} \quad (1)$$

In Equation (1), T is the temperature in kelvin, $V_F$ is the forward voltage across a diode and $C_1$ and $C_2$ are constants that may be empirically defined. These constants $C_1$ and $C_2$, however, vary from device to device and require calibration to determine. Because calibration for specific devices is required, this method is highly impractical in a high-volume production process.

The forward voltage across a diode $V_F$ is expressed as:

$$V_F = (nkT/q)\ln(I_F/I_S) \quad (2)$$

where $I_S$ is the saturation current, q is the electron charge ($1.6 \ast 10^{-19}$ Coulombs), k is Boltzmann's constant ($1.38 \ast 10^{-23}$ J/° K), n is the ideality constant, and T is the temperature in kelvin. When a known forward current flows through the diode, one can measure the forward voltage $V_F$. One can then calculate the diode temperature if the actual values for the saturation current $I_S$ are known. The saturation current $I_S$, however, is very process dependent and also varies with temperature.

Another temperature measurement technique known in the art simplifies the calibration process by using two known current sources with a fixed ratio of N, allowing the effect of the saturation current $I_S$ to be eliminated. This is done by taking a forward voltage measurement when the forcing current $I_F$ passes through the diode, and taking a second voltage measurement when current $N \ast I_F$ passes through the diode. As shown by the following expression, the difference in forward voltage obtained by dividing one measurement by the other is a function of the temperature and does not depend on saturation current $I_S$.

$$(V_{F_2} - V_{F_1}) = (nkT/q)\ln(N) \quad (3)$$

This method, however, has several disadvantages. First, for a temperature change in the order of 1 kelvin, the corresponding voltage difference change obtained using this measurement technique is three to four orders of magnitude smaller than the magnitude of the diode drop voltage. Further, the resistance of the conductor leads that provide the current to the diode and detect the voltage drop can induce significant error to the measurement. The effect of lead resistance can be removed by making yet a third measurement with a forcing current different than the first two, but the process grows more complex with the requirement of three very precise measurements. Second, the need to switch current level for each temperature measurement slows down the operation of the temperature management system by limiting the sampling speed due to the settling time and filtering requirement at each current level. Third, rapid switching of current in the diode can generate unacceptable electrical noise in the IC chip. Finally, in a situation where the temperature is changing significantly between measurements, the saturation current $I_S$ also changes significantly between measurements. Thus, the cancellation in the process is not valid and the measurements are erroneous.

Takashima et al., "Investigation on the Diode Temperature-Sensor with the Output Voltage Proportional to the Absolute Temperature," IEEJ Trans. SM, Vol. 127, No. 6 (2007) discloses a technique intended to obtain an output voltage proportional to the absolute temperature using a diode sensor, wherein an ac voltage change in the diode due to temperature change is measured for a constant amplitude of an ac current superimposed on a forward dc current. Takashima principally discloses application of a square wave from which peak to peak measurements of the resulting output voltages can be determined. Such technique is substantially the same as the above-noted technique in which two forcing currents are applied to a diode sensor and is susceptible to the drawbacks previously described. Further, the technique disclosed by Takashima does not allow a rapid response to temperature changes in a device and fails to compensate for lead resistance associated with the diode sensor.

Accordingly, what is desired is a temperature sensing diode apparatus, method and system that can measure temperature in a faster and more efficient process, while keeping noise interference to a minimum. Further, it is desired to provide accurate dynamic temperature data in processes that require rapid, responsive temperature control.

SUMMARY

The present invention is directed to apparatus, methods and systems for detecting the temperature of various devices.

According to one embodiment, an apparatus includes a semiconductor temperature sensor provided to detect the temperature of the device. A current source provides a forcing current through the temperature sensor. The forcing current includes a time varying component and a dc component sufficient to forward bias the sensor. A voltage detector detects the resulting time varying voltage across the temperature sensor, and a differentiator circuit is used to obtain a resulting time derivative of the voltage across the temperature sensor from which the temperature of the device can be determined.

In certain embodiments of the invention, the system includes a differential amplifier circuit and a multiplier circuit that obtain a difference in the voltage across the temperature sensor and the voltage across a compensating resistor that is multiplied by a factor that can be adjusted, so as to substantially eliminate effects of the lead resistance of the temperature sensor from a detected temperature of the temperature sensor.

In some embodiments, the time varying component is a periodic alternating current, such as a sinusoidal alternating current. In some embodiments, the frequency of the alternating current is at least 1 kHz.

In certain embodiments, the resulting time derivative of the voltage across the temperature sensor is used to generate a signal representative of the temperature of the device according to the following relationship:

$$avg\left(\frac{dV_m}{dt}\right) = gain * avg\left|nT * \frac{\omega_k}{q}\left(\frac{\cos(\omega t)}{\frac{I_c}{I_a} + \sin(\omega t)}\right)\right|,$$

wherein $V_m$ is the detected time varying voltage across the temperature sensor, n is an ideality factor, T is the absolute temperature of the temperature sensor, k is Boltzmann's constant, $I_c/I_a$ is a ratio between the dc component of the forcing current and the time varying component of the forcing current, $\omega$ is the radial frequency of the time varying forcing current, and q is the charge of an electron.

In some embodiments of the invention, the semiconductor sensor comprises a semiconductor diode or the base-emitter junction of a transistor.

In some embodiments of the invention, the apparatus includes a thermal control system that controls the temperature of the device in response to the detected temperature. In some of such embodiments, there may be included a test apparatus for testing the device, wherein the thermal control system monitoring the temperature of the device maintains the device under test at or near a set predetermined set point temperature.

According to another embodiment, a method for detecting device temperature includes applying a time varying forcing current through a semiconductor temperature sensor, wherein the time varying forcing current includes a time varying component and a dc component sufficient to forward bias the semiconductor temperature sensor. The resulting time varying voltage across the temperature sensor is detected, and a time derivative of the resulting time varying voltage across the temperature sensor is used to generate a signal representative of the temperature of the device.

Various benefits are provided by the invention. One benefit of certain embodiments of the invention is the ability to control thermal management of a device without first having to perform calibration to determine characteristics of the temperature sensor. Furthermore, embodiments of this invention improve upon other non-calibration techniques by allowing for a faster voltage retrieval and temperature determination process with less noise using a simpler design. The temperature feedback behaves as a continuous signal that has minimal lag from the actual device temperature with a bandwidth at least an order of magnitude greater than the actual control circuit. This also allows integrated circuit testers, for instance, to potentially increase the amount of semiconductor based products being tested per hour or reduce the temperature error band during a test, which can increase yield.

BRIEF DESCRIPTION OF THE DRAWINGS

Embodiments of the invention are described by referring to the attached drawings, in which.

DETAILED DESCRIPTION OF PREFERRED EMBODIMENTS

Various embodiments of this invention provide systems and methods for measuring temperature by applying a time varying current to a semiconductor temperature sensor, such as a diode or transistor, thereby making it unnecessary to calibrate the sensor or provide two discrete forcing currents to the temperature sensor. In these embodiments, the resulting derivative of the voltage across the sensor is measured and used to calculate the temperature of a device. Advantageously, in certain embodiments, the voltage across a compensating resistor is used to offset the series lead resistance of the temperature sensor. Furthermore, these systems and methods may include various additional input variables known in the art to determine device temperature, in addition to the time varying voltage across the temperature sensor and the time varying voltage across the compensating resistor.

Such factors known in the art include, but are not limited to factors necessary for electronics calibration, frequency drift compensation and feedback correction.

Figure 1:
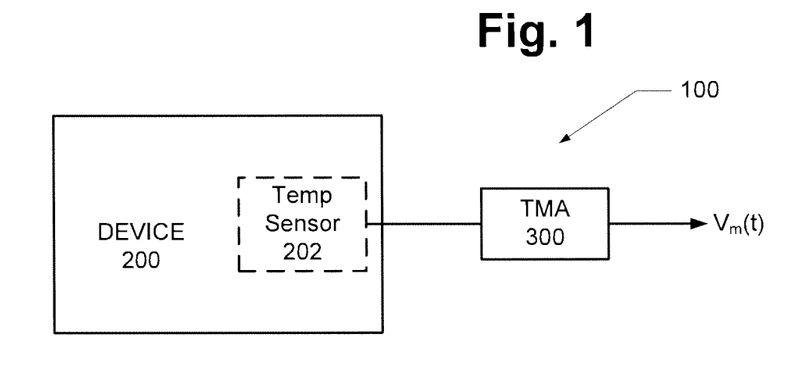
FIG. 1 is a schematic of an exemplary implementation of a system including a device being measured for temperature and a temperature measuring apparatus.

FIG. 1 is a general block diagram of a system 100 that includes a device 200 and a temperature measuring apparatus (TMA) 300. As illustrated in this exemplary system, a temperature sensor 202 is provided within the device 200. The temperature sensor may comprise a diode or a junction of a transistor incorporated into a device whose temperature is to be measured. The device may comprise, for example, a semiconductor IC. It will be appreciated, however, that the temperature sensor 202 may be provided separately on or near the device 200 at a location in which temperature is to be measured.

The TMA shown in this example detects the voltage across the temperature sensor 202 and outputs a time varying voltage $V_m(t)$. As described herein, this voltage may be used to obtain a signal representative of the absolute temperature of the device temperature, which can be used in a variety of ways. Advantageously, the signal can be acquired rapidly and used as a control parameter for heating or cooling the device 200. For example, the device 200 may comprise a semiconductor device under test, wherein the device under test undergoes rapid changes in power dissipation that could affect the device temperature and thus affect performance. However, it will be appreciated that application of the invention is not so limited, and can be applied to measure temperature of other devices in other environments.

Figure 2:
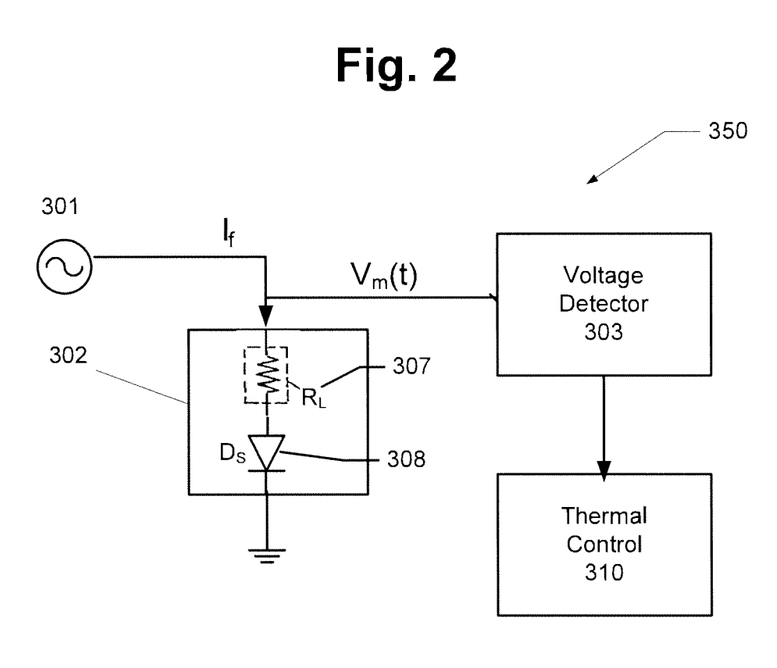
FIG. 2 is a schematic of an exemplary implementation of a temperature measuring apparatus attached to a control system.

As shown in FIG. 2, a system 350 includes a time varying current source 301, a temperature sensor 302 and a voltage detector 303. As discussed below, the detected time varying voltage is a function of the temperature of the sensor. Accordingly, this output may be used to perform various overall electronic system adjustments including, but not limited to, thermal management adjustments. Overall electronic system adjustments may comprise using the time varying output voltage to regulate heat applied or removed from the system so as to maintain the device at or near a predetermined set point temperature. This is illustrated generally in this example by block 310, which may include a testing apparatus for testing a device whose temperature is being detected. Again, other applications of the detected voltage may be employed.

In the exemplary embodiment of FIG. 2, the current source 301 applies a forcing current $I_F$ through the temperature sensor 302. The forcing current $I_F$ includes a dc component $I_c$ that maintains the proper bias of the temperature sensor and a time varying component $I_a$. In this example, the temperature sensor 302 comprises a semiconductor based component 308, which may be one of various types of diodes known in the art, including a p-n junction semiconductor diode, or, for example, the base-emitter junction of a transistor. Resistance $R_L$ 307 is representative of the lead resistance of the temperature sensor 302. The time varying current $I_F$ develops a voltage across the diode 308 and is detected by a voltage detector 303. This time varying voltage can be detected by various methods, including an analog detection circuit such as described in more detail below. The output voltage varies based on the temperature at or near the sensor.

In the embodiment of FIG. 2, the voltage detector 303 does not need to sample two separate voltages for two separate, discrete current levels to calculate the temperature as is done in the previous techniques. Accordingly, the system illustrated is a significant improvement over such techniques. For example, use of only one current source increases the maximum sampling speed due to the settling time and the filtering requirement at each level. Furthermore, using only a time varying current $I_F$ from the current source 301 can reduce electrical noise that may be generated from having to rapidly switch currents as is done in the prior techniques, which would cause a reduction in the accuracy of the temperature calculations and further deteriorate the efficiency of the thermal detection and management system.

Figure 3:
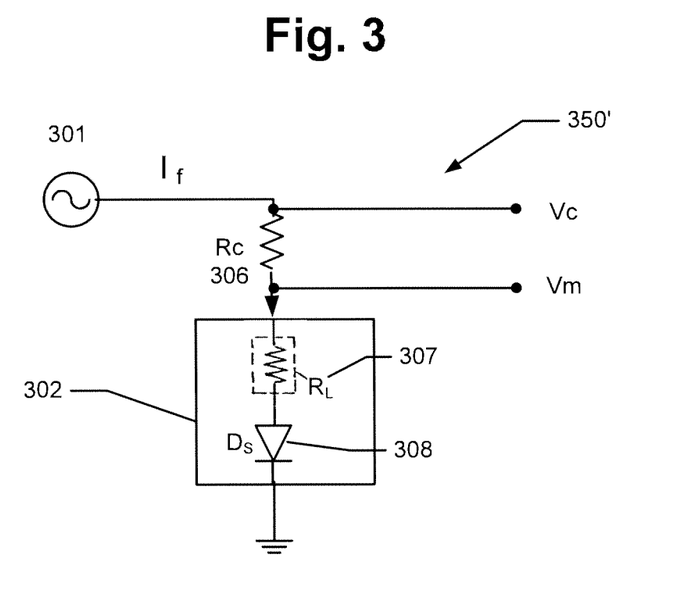
FIG. 3 is a schematic of an exemplary implementation of a temperature measuring apparatus that includes a resistor used in the process of compensating for the sensor lead resistance.

FIG. 3 illustrates an embodiment of a temperature measuring apparatus 350' in which a compensating resistor Rc 306 is provided in series with the temperature sensor 302. Here, the forcing current generates a voltage $(V_c-V_m)$ across the compensating resistor 306 and a voltage $V_m$ across the temperature sensor 302. The voltage $(V_c-V_m)$ can be used to account for the effects of lead resistance $R_L$ 307 of the temperature sensor 302 and increase accuracy of the thermal management system.

Specifically, for all semiconductor diodes, the following holds true:

$$I_F = I_S \left( e^{\frac{qV_{be}}{nkT}} - 1 \right) \approx I_S e^{\frac{qV_{be}}{nkT}} \tag{4}$$

wherein:
k is Boltzmann's constant ($1.38*10^{-23}$ J/° K),
n is the ideality factor, which is process dependent (ideal=1, usually≅1),
q is the electron charge ($1.6*10^{-19}$ Coulombs),
$I_F$ is the forward current (A) through base emitter (diode) junction
$I_s$ is the saturation current (A), which is process dependent and is a function of temperature, but not of $I_F$,
$R_L$ is the lead resistance (Ω),
$V_{be}$ is the base emitter (diode) voltage drop (V),
$V_m$ is the measured diode voltage drop (V) and
T is the junction temperature (K).

Under a static method, which has typically been used, two separate forcing currents are sent through a temperature sensor, and a voltage detector measures the voltage drop across the diode at these two forcing currents. Equation (4) is then used to calculate temperature. For example, using forcing currents $I_{F1}$=10 µA and $I_{F2}$=100 µA yields:

$$10 \text{ µA} = I_S e^{\frac{qV_{be1}}{nkT}} \tag{5}$$

and $$100 \text{ µA} = I_S e^{\frac{qV_{be2}}{nkT}} \tag{6}$$

Dividing the second result by the first one gives:

$$10 = e^{\frac{q(V_{be2}-V_{be1})}{nkT}} \Rightarrow \ln(10) = \frac{q(V_{be2}-V_{be1})}{nkT} \tag{7}$$

or $$T = \frac{q(V_{be2}-V_{be1})}{nk\ln(10)} \tag{8}$$

or $$(V_{be2}-V_{be1}) = \frac{nk\ln(10)}{q}T$$

In practice the lead resistance $R_L$ from the actual diode to the measurement points must be accounted for, therefore:

$$V_{be}=V_m-R_L I_F \tag{9}$$

Accordingly, when $R_L$ is introduced, equation (8) becomes:

$$T = \frac{q((V_{m2} - V_{m1}) - R_L(I_{F2} - I_{F1}))}{nk\ln(10)} \quad (10)$$

indicating that under these conditions there is an error of about 0.5° C. introduced for every 1Ω of lead resistance. The sensitivity of this measurement is:

$$\frac{d(V_{be2} - V_{be1})}{dT} = \frac{nk\ln(10)}{q} = n199\left(\frac{\mu V}{°C.}\right) \quad (11)$$

where n is typically a number slightly greater than 1. Accordingly, this prior static temperature detection method has an undesirable inaccuracy and lack of speed, which the present invention improves upon. Further, in practice, accounting for lead resistance may require use of a third forcing current as noted above.

Using the dynamic time dependent temperature measurement apparatus according to embodiments of the invention reduces the inaccuracy prevalent in conventional static temperature measurements and provides a much faster response. Specifically in the embodiments of the invention shown in FIGS. 2 and 3, the original diode equation (4) is still applicable. Rearranging equation (4) leads to this result:

$$\frac{I_F}{I_S} = e^{\frac{qV_{be}}{nkT}} \Rightarrow \ln\left(\frac{I_F}{I_S}\right) = \frac{qV_{be}}{nkT} \Rightarrow V_{be} = \frac{nkT}{q}\ln\left(\frac{I_F}{I_S}\right) \quad (12)$$

Here the voltage is no longer measured statically, but rather is time dependent. Taking the derivative of $V_{be}$ with respect to time yields:

$$\frac{dV_{be}}{dt} = \frac{nkT}{q}\left(\frac{1}{I_F}\frac{dI_F}{dt}\right) \quad (13)$$

In this case, the forward current through the base emitter (diode) junction $I_F$, comprises two components. The first component $I_c$, is a constant current that is used to continuously forward bias the diode 308. The second component $I_a$ is an alternating current. For example, $I_a$ could be a periodic alternating current, such as a sinusoidally alternating current. It should be appreciated, however, that other alternating currents may be employed.

In the case of a sinusoidal time varying current with radial frequency ω:

$$I_F = I_c + I_a\sin(\omega t) \Rightarrow \frac{dI_F}{dt} = \omega I_a\cos(\omega t) \quad (14)$$

Accordingly, substituting the time dependent voltage equation into equation (13) results in:

$$\frac{dV_{be}}{dt} = \frac{nkT}{q}\left(\frac{\omega\cos(\omega t)}{\frac{I_c}{I_a} + \sin(\omega t)}\right) \quad (15)$$

Accounting for the lead resistance $R_L$ from the actual diode in equation (15) results in:

$$\frac{dV_m}{dt} = \frac{dV_{be}}{dt} + R_L\left(\frac{dI_F}{dt}\right) \quad (16)$$

$$= \frac{nkT}{q}\left(\frac{\omega\cos(\omega t)}{\frac{I_c}{I_a} + \sin(\omega t)}\right) + R_L I_a\omega\cos(\omega t)$$

The system of FIG. 3 provides an advantageous technique to calibrate out the diode lead resistance. Specifically, if the alternating current $I_a$ is varied while the ratio of constant current $I_c$ to alternating current $I_a$ is kept constant, then the effect of load resistance can be quantified and compensated. Here, if the ratio between the constant current and alternating current is kept constant:

$$\left(\frac{I_c}{I_a} = \text{constant}\right) \quad (17)$$

then the value measured for $$\text{avg}\left(\frac{dV_m}{dt}\right) \quad (18)$$

will not vary with current amplitude if the lead resistance $R_L$ is equal to zero. This fact allows the effective lead resistance to be determined during a measurement.

Again referencing FIG. 3, placing a compensating resistor $R_c$ in series arrangement with the temperature sensor 302 allows the manipulation of the equation for the time varying voltage such that the effects of $R_L$ on the temperature calculation are eliminated. If one now multiplies the voltage measured across this resistor $R_c$ by a factor α and then subtracts this from the previous measurement, one obtains:

$$\text{avg}\left(\frac{d(V_m - \alpha(V_c - V_m))}{dt}\right) = \quad (19)$$

$$\text{gain} * \text{avg}\left|nT * \frac{\omega k}{q}\left(\frac{\cos(\omega t)}{\frac{I_c}{I_a} + \sin(\omega t)}\right) + (R_L - \alpha R_c)I_a\omega\cos(\omega t)\right|$$

In this case, the constant α can be changed until the result does not vary with current amplitude. Then the lead resistance $R_L$ can be determined as follows:

$$R_L = \alpha R_c \quad (20)$$

Significantly, this allows a direct measurement of temperature without the effect of $R_L$, wherein:

$$\text{avg}\left(\frac{dV_m}{dt}\right) = \text{gain} * \text{avg}\left|nT * \frac{\omega k}{q}\left(\frac{\cos(\omega t)}{\frac{I_c}{I_a} + \sin(\omega t)}\right)\right| \quad (21)$$

Figure 4:
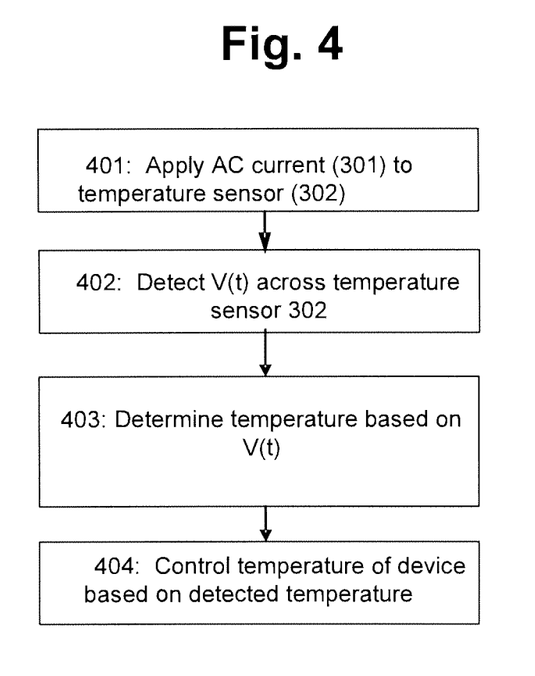
FIG. 4 is a flow chart showing the exemplary implementation associated with the schematic in FIG. 2.

FIG. 4 is a flow chart that illustrates a temperature sensing method as applied in the system shown in FIG. 2. In this process, a forcing current with a time varying component is applied to the temperature sensor 302 (step 401). As illustrated in step 402, the resulting time dependent voltage $V_m$ across temperature sensor 302 is detected. In step 403, the temperature is calculated from $V_m$. Finally, in step 404, the measured temperature is used (in this example) to control the temperature of the device 304.

Figure 5:
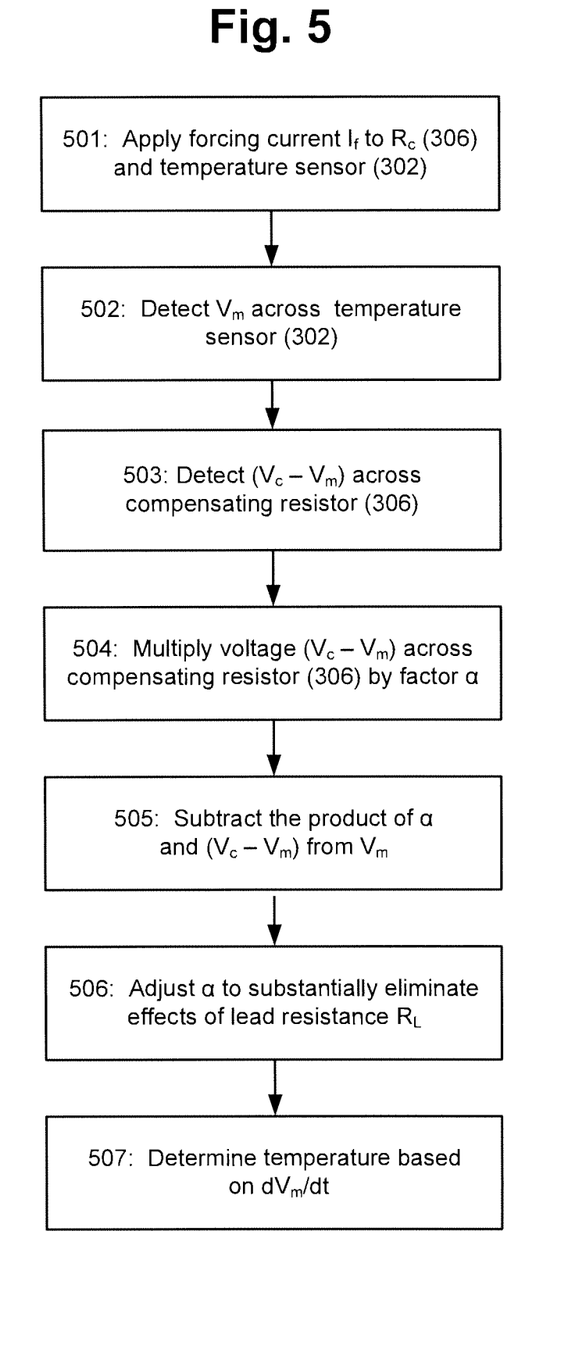
FIG. 5 is a flow chart showing the exemplary implementation associated with the schematic in FIG. 3.

FIG. 5 is a flow chart that shows the process that occurs in the exemplary embodiment shown in FIG. 3. Here, a forcing current that includes a time varying component and a constant component with a constant ratio is applied to temperature sensor 302 and compensating resistor $R_c$ 306 in the initial step 501. In step 502 the time dependent voltage Vm(t) is detected. The voltage ($V_c-V_m$) across the compensating resistor $R_c$ is detected at step 503. In this example, the voltage ($V_c-V_m$) across the compensating resistor $R_c$ is then multiplied by a factor α (step 504). The product of α and ($V_c-V_m$) is then subtracted from $V_m$ (step 505). While maintaining the ratio of $I_a$ and $I_c$, the factor α is adjusted until the result does not vary with current amplitude (step 506). As a result, the effect of lead resistance $R_L$ can be substantially eliminated. The derivative of the resulting signal can then be obtained and utilized to determine temperature of the device, directly control device temperature or used in another manner (step 507). The adjustment of α can be done only once before a test begins, then providing essentially real time measurement of device temperature that has been compensated for lead resistance during the entire test duration.

It will be appreciated that various embodiments may be utilized to obtain a signal representative of device temperature. By way of example, FIG. 6 and illustrate an embodiment that may be used to rapidly obtain an accurate signal representative of the absolute temperature of a device. Note: the polarities of $V_c$ and $V_m$ in this circuit example are the opposite of the nomenclature used in the rest of this document.

Figure 6:
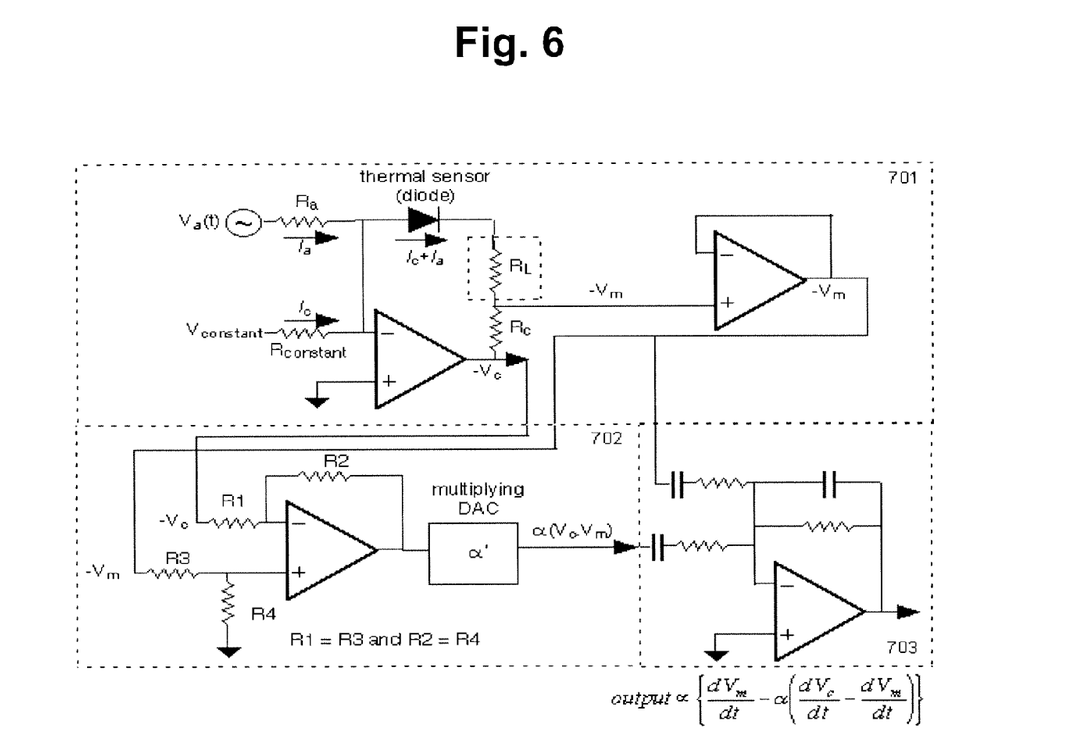
FIGS. 6 and 7 are schematic illustrations of an exemplary system in which a semiconductor temperature sensor is forced with a time varying current input to obtain a signal indicative of temperature.

In FIG. 6, a circuit 701 includes a time varying voltage $V_a(t)$ is applied across a resistor $R_a$ and a virtual ground to provide a time varying current $I_a$. A constant voltage is applied across a resistor Rconstant and the virtual ground to provide a constant current $I_c$. The sum of these currents ($I_c+I_a$) constitutes a forcing current that is applied through a compensating resistor $R_c$ and a thermal sensor (a diode in this example) having lead resistance $R_L$. The voltage $-V_m$ at the junction between the thermal sensor and the compensating resistor $R_c$ is supplied to a buffer with an output $-V_m$.

As shown in circuit 702, the voltage $-Vc$ is supplied via resistor R1 to the inverting input of an op amp. The output of the op amp is connected via a resistor R2. The output $-Vm$ from circuit 701 is supplied to the non-inverting input of the op amp via resistor R3. The non-inverting input is connected to ground via resistor R4. The op amp in circuit 702 outputs the difference between Vc and Vm which is then multiplied by a factor α to obtain α($V_c-V_m$).

As shown in circuit 703, the output $-V_m$ of circuit 701 and the output from the differential amplifier and multiplier circuit 702 are summed into the inverting input of the differentiating amplifier in 703. As discussed above, the constant α can be adjusted until the output of 703 (or either 705 or 707, discussed further below) does not vary with the amplitude of the forcing current. This permits adjustment to determine the lead resistance $R_L$ and essentially eliminate the effects of lead resistance from the measured temperature. The output of differentiator circuit 703 is used to obtain a value proportional to ($dV_m/dt$).

Figure 7:
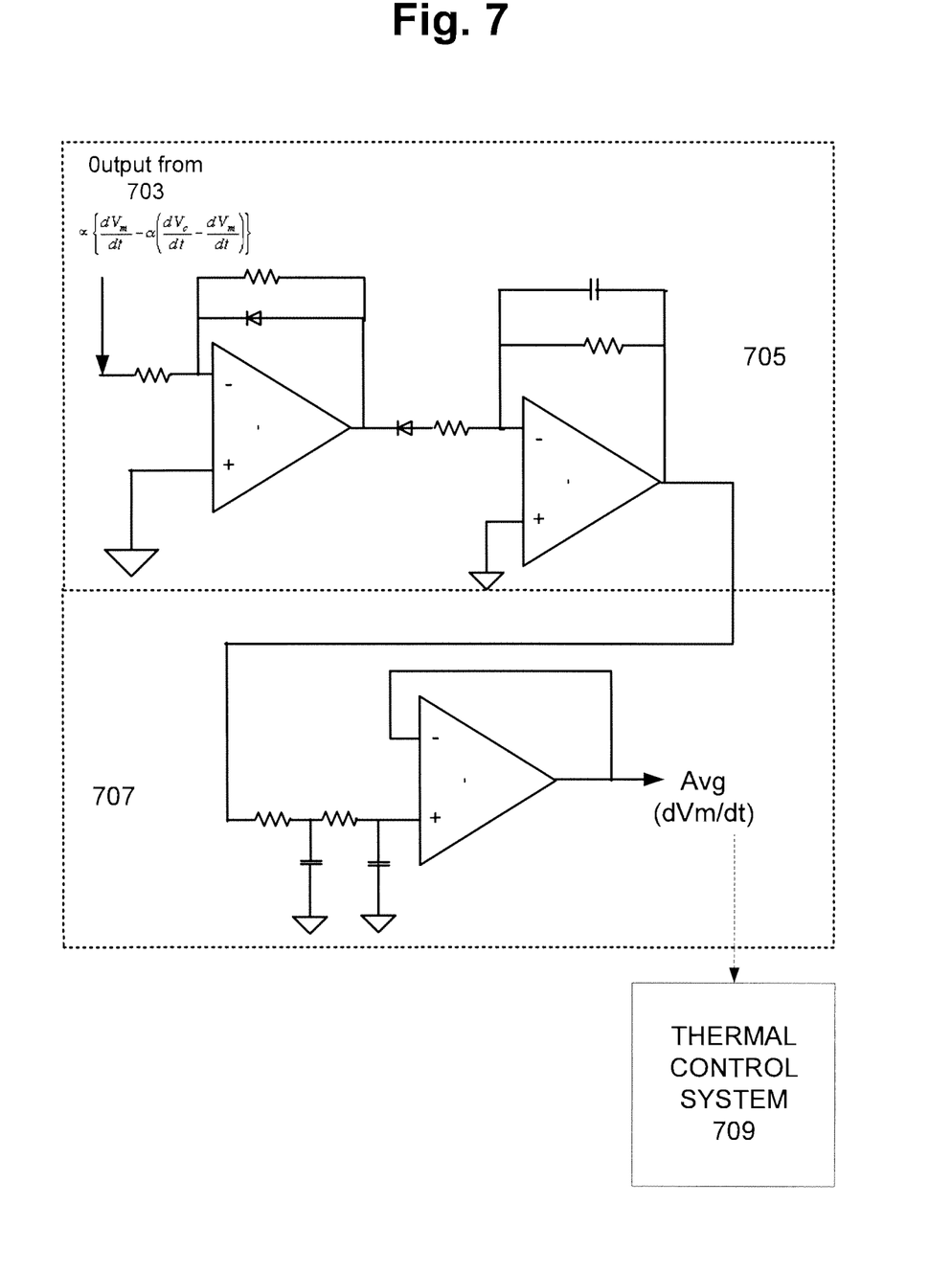

Referring now to FIG. 7, the output from differentiator circuit 703 is then applied to a precision rectifier circuit 705. The rectified output is then filtered by circuit 707 to obtain $\text{avg}(dV_m/dt)$. This signal is representative of the temperature of the thermal sensor as shown in Equation (21).

It will be appreciated that the resulting signal can then be used in a variety of ways. Advantageously, it can be used as direct feedback in a system that adjusts device temperature. For example, it can be used as a control signal to a control system that adjusts the temperature of a device according to various techniques known in the art. Specifically, the temperature signal can be used to maintain the device temperature at or near a desired set point temperature during operation or testing of the device.

Again, it should be appreciated that the specific detection circuit illustrated in FIGS. 6 and 7 is merely exemplary and various other embodiments may be used to detect the time varying voltage across the sensor. Further, in some applications, the time varying voltage may be used to determine detected temperature of the sensor.

Figure 8:
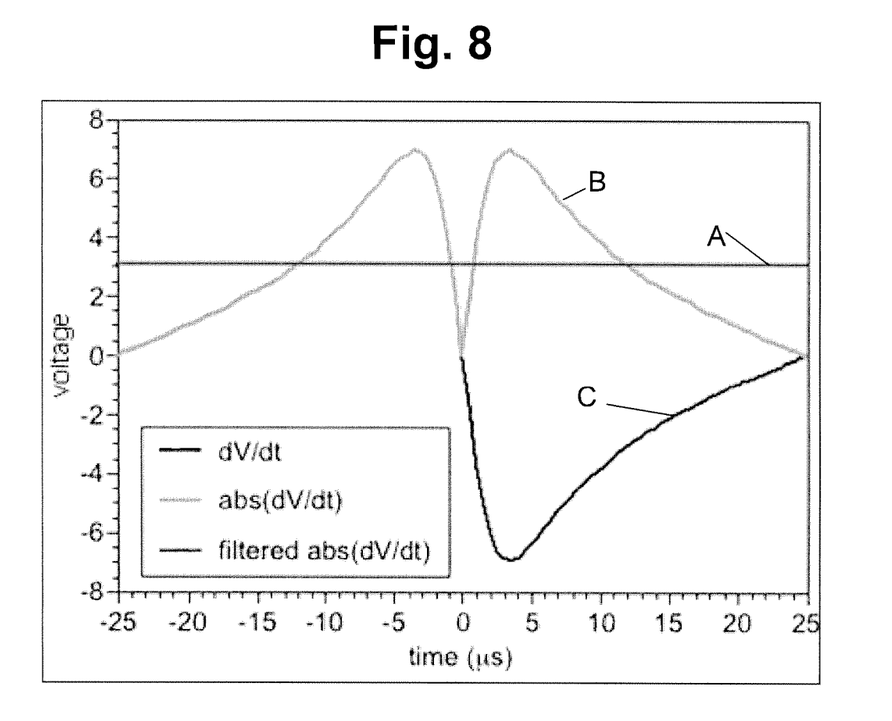
FIG. 8 is a graph of resulting signals obtained from a temperature measuring system according to an embodiment of the invention.

FIG. 8 is a graph of actual signals obtained using an embodiment of the invention. In this case a diode sensor was forced with a 20 kHz sinusoidal signal. Plot C shows the differential signal that is proportional to $dV_m/dt$. Plot B shows the rectified value of the signal that is proportional to $dV_m/dt$. Plot A shows the absolute value of signal proportional to $dV_m/dt$, filtered with a time constant of 1 ms. This signal provides a direct representation of the absolute temperature of the sensor.

Figure 9:
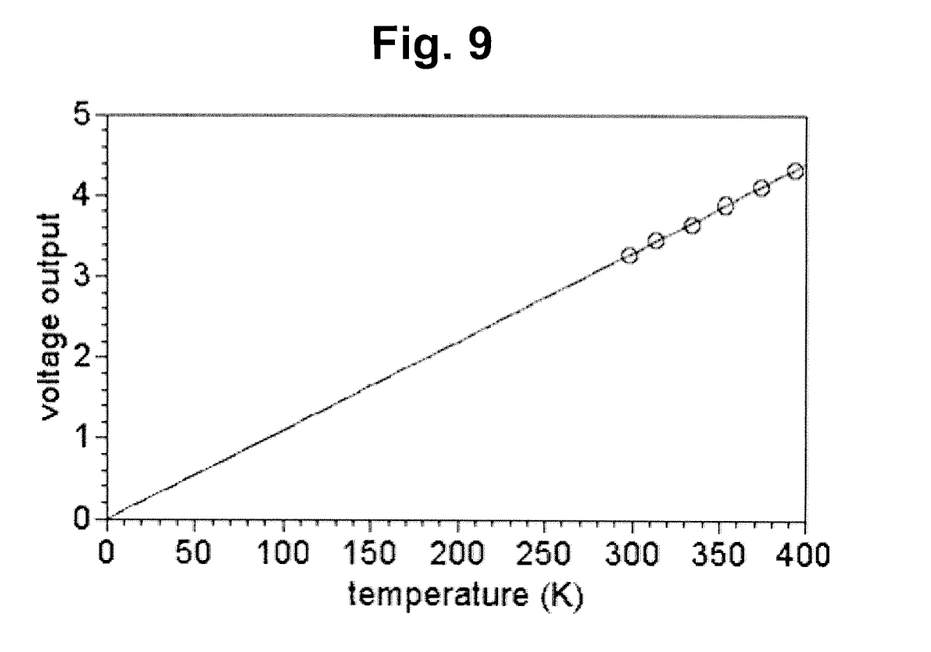
FIG. 9 is a graph a plot of temperature versus output voltage resulting from a temperature system according to an embodiment of the invention.

FIG. 9 is a graph of temperature versus output voltage, which was obtained from an experimental embodiment of the invention. Notably, with the gain chosen the sensitivity of this example yields approximately 11 mV dc voltage change per ° C., a significant advantage over prior techniques. Again, although a sinusoidal signal was used in this example, other time varying signals may be employed.

Significantly, the embodiments of the invention described above provide the ability to control thermal management of a device without first having to perform calibration to determine characteristics of the temperature sensor. For example, there is no need to use two forcing currents or to calculate lead resistance of the temperature sensor with a third forcing current. Furthermore, the above-described embodiments of the invention improve upon prior non-calibration techniques by allowing for a faster voltage retrieval and temperature determination process with less noise using a simpler design. With a significantly faster temperature feedback signal, the bandwidth of the temperature control system can be increased, which results in less deviation from the desired test set point temperature. Better temperature control directly affects the yield in the test process.

Prior art methods using two discrete current have a sensitivity of approximately 200 μV per 1° C. change in temperature with the measured voltage drop across the temperature sensor typically near 0.7V. For example, in order to measure temperatures with a resolution of 0.1° C. requires a noise level less than 0.003% of the signal. In many situations, such as test environments, the electrical noise levels can be high, requiring multiple samples and filtering. This is especially critical to a control system, which requires a derivative term that can be very sensitive to noise in the input signal and its resolution. Obtaining necessary feedback in a noisy system will either cause unacceptable lag or error. If the time lag is significant enough, then additional error can be introduced if the temperature has changed, thereby making the cancellation of saturation current part of the process invalid. In the embodiments of the invention described it is possible by differentiation to eliminate the dc voltage component from the thermal sensor voltage output and obtain a much higher signal to noise ratio regardless of the gain that is set. This dc voltage component is also temperature dependent and more difficult to remove in the non-differentiated state. Previous methods limit the ac forcing current frequency to the practical capability of high resolution (18 bit+) sample and hold data acquisition systems and their response or accuracy suffers in noisy environments if filtering is required. The method described here does not have a limit on the ac forcing frequency and, with filtering, can produce a signal with a response bandwidth orders of magnitude higher than the previous methods. This method can produce a continuous signal that is proportional to the temperature with unlimited resolution.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. To the extent that individual references, including issued patents, patent applications, and non-patent publications, are described or otherwise mentioned herein, such references are not intended and should not be interpreted as limiting the scope of the following claims.

What is claimed is:

1. An apparatus for measuring the temperature of a device comprising:
    a semiconductor temperature sensor provided to detect the temperature of the device;
    a current source configured to provide a forcing current through the temperature sensor, including a time varying component and a dc component sufficient to forward bias the sensor;
    a voltage detector configured to detect a resulting time varying voltage across the temperature sensor; and
    a differentiator circuit configured to obtain a resulting time derivative of the voltage across the temperature sensor from which the temperature of the device can be determined.

2. The apparatus of claim 1, further comprising a compensating resistor arranged in series with the temperature sensor, whereby series lead resistance of the temperature sensor can be determined.

3. The apparatus of claim 2, further comprising a differential amplifier circuit and a multiplier circuit configured to obtain a difference in the voltage across the temperature sensor and the voltage across the compensating resistor that is multiplied by a factor that can be adjusted so as to substantially eliminate effects of the lead resistance of the temperature sensor from a detected temperature of the temperature sensor.

4. The apparatus of claim 1, wherein the time varying component is a periodic alternating current.

5. The apparatus of claim 4, wherein the time varying component is a sinusoidal alternating current.

6. An apparatus according to claim 4, wherein the frequency of the alternating current is at least 1 kHz.

7. The apparatus of claim 5, wherein the resulting time derivative of the voltage across the temperature sensor is used to generate a signal representative of the temperature of the device according to the following relationship:

$$\mathrm{avg}\left(\frac{dV_m}{dt}\right) = \mathrm{gain} * \mathrm{avg}\left|nT * \frac{\omega k}{q}\left(\frac{\cos(\omega t)}{\frac{I_c}{I_a} + \sin(\omega t)}\right)\right|,$$

wherein $V_m$ is the detected time varying voltage across the temperature sensor, n is an ideality factor, T is the absolute temperature of the temperature sensor, k is Boltzmann's constant, $I_c/I_a$ is a ratio between the dc component of the forcing current and the time varying component of the forcing current, $\omega$ is the radial frequency of the time varying forcing current, and q is the charge of an electron.

8. The apparatus of claim 1, wherein the semiconductor sensor comprises a semiconductor diode.

9. The apparatus of claim 1, wherein the semiconductor sensor comprises the base-emitter junction of a transistor.

10. The apparatus of claim 1, further comprising a thermal control system that controls the temperature of the device in response to the detected temperature.

11. The apparatus of claim 10, further comprising a test apparatus for testing the device, wherein the thermal control system monitoring the temperature of the device at or near a set predetermined set point temperature.

12. A method for measuring the temperature of a device, comprising:
    applying a time varying forcing current through a semiconductor temperature sensor, wherein the time varying forcing current includes a time varying component and a dc component sufficient to forward bias the semiconductor temperature sensor,
    detecting the resulting time varying voltage across the temperature sensor, and
    obtaining a time derivative of the resulting time varying voltage across the temperature sensor to generate a signal representative of the temperature of the device.

13. The method of claim 12, further comprising providing a compensating resistor in series with the temperature sensor and detecting a resulting voltage across the compensating resistor from which lead resistance of the temperature sensor can be determined.

14. The method of claim 13, further comprising obtaining a difference in the voltage across the temperature sensor and the voltage across the compensating resistor that is multiplied by a factor that can be adjusted so as to substantially eliminate effects of the lead resistance of the temperature sensor from a detected temperature of the temperature sensor.

15. The method of claim 12, wherein the time varying component is a periodic alternating current.

16. The method of claim 15, wherein the periodic alternating current is sinusoidal.

17. The method of claim 15, wherein the frequency of the alternating current is at least 1 kHz.

18. The method of claim 16, wherein the resulting time derivative of the voltage across the temperature sensor is used to generate a signal representative of the temperature of the device according to the following relationship:

$$\text{avg}\left(\frac{dV_m}{dt}\right) = \text{gain} * \text{avg}\left|nT * \frac{\omega k}{q}\left(\frac{\cos(\omega t)}{\frac{I_c}{I_a} + \sin(\omega t)}\right)\right|,$$

wherein $V_m$ is the detected time varying voltage across the temperature sensor, n is an ideality factor, T is the absolute temperature of the temperature sensor, k is Boltzmann's constant, $I_c/I_a$ is a ratio between the dc component of the forcing current and the time varying component of the forcing current, $\omega$ is the radial frequency of the time varying forcing current, and q is the charge of an electron.

19. The method of claim 12, wherein the semiconductor sensor comprises a semiconductor diode.

20. The method of claim 12, wherein the semiconductor sensor comprises the base-emitter junction of a transistor.

21. The method of claim 12, further comprising controlling the temperature of the device in response to the signal representative of the detected temperature of the device.

22. The method of claim 21, further comprising maintaining the temperature of the device at or near a set predetermined set point temperature based the signal representative of the detected temperature of the device.

23. An apparatus for measuring the temperature of a device, comprising:
means for applying a time varying forcing current through a semiconductor temperature sensor, wherein the time varying forcing current includes a time varying component and a dc component sufficient to forward bias the semiconductor temperature sensor;
means for detecting the resulting time varying voltage across the temperature sensor, and
means for obtaining a time derivative of the resulting time varying voltage across the temperature sensor to generate a signal representative of the temperature of the device.

24. The apparatus of claim 23, further comprising means for providing a compensating resistor in series with the temperature sensor and detecting a resulting voltage across the compensating resistor from which lead resistance of the temperature sensor can be determined.

25. The apparatus of claim 24, further comprising means for obtaining a difference in the voltage across the temperature sensor and the voltage across the compensating resistor that is multiplied by a factor that can be adjusted so as to substantially eliminate effects of the lead resistance of the temperature sensor from a detected temperature of the temperature sensor.

26. The apparatus of claim 23, wherein the time varying component is a periodic alternating current.

27. The apparatus of claim 26, wherein the periodic alternating current is sinusoidal.

28. The apparatus of claim 26, wherein the frequency of the periodic alternating current is greater than 1 kHz.

29. The apparatus of claim 27, wherein the resulting time derivative of the voltage across the temperature sensor is used to generate a signal representative of the temperature of the device according to the following relationship:

$$\text{avg}\left(\frac{dV_m}{dt}\right) = \text{gain} * \text{avg}\left|nT * \frac{\omega k}{q}\left(\frac{\cos(\omega t)}{\frac{I_c}{I_a} + \sin(\omega t)}\right)\right|,$$

wherein $V_m$ is the detected time varying voltage across the temperature sensor, n is an ideality factor, T is the absolute temperature of the temperature sensor, k is Boltzmann's constant, $I_c/I_a$ is a ratio between the dc component of the forcing current and the time varying component of the forcing current, $\omega$ is the radial frequency of the time varying forcing current, and q is the charge of an electron.

30. The apparatus of claim 23, wherein the semiconductor sensor comprises a semiconductor diode.

31. The apparatus of claim 23, wherein the semiconductor sensor comprises the base-emitter junction of a transistor.

32. The apparatus of claim 23, further comprising means for controlling the temperature of the device in response to the signal representative of the detected temperature of the device.

33. The apparatus of claim 23, further comprising means for maintaining the temperature of the device at or near a set predetermined set point temperature based the signal representative of the detected temperature of the device.

34. The apparatus of claim 32, further comprising means for maintaining the temperature of the device at or near a set predetermined set point temperature based the signal representative of the detected temperature of the device.

* * * * *